June 7, 1960  H. LINSCHITZ  2,939,959
REVERSIBLE RADIATION-DOSIMETER
Filed Oct. 30, 1958

INVENTOR,
HENRY LINSCHITZ.
BY
Harry M. Saragovitz
ATTORNEY.

United States Patent Office 2,939,959
Patented June 7, 1960

2,939,959

REVERSIBLE RADIATION-DOSIMETER

Henry Linschitz, Cambridge, Mass., assignor to the United States of America as represented by the Secretary of the Army Filed Oct. 30, 1958, Ser. No. 770,902

2 Claims. (Cl. 250—83)

This invention relates to a reversible radiation dosimeter for measuring ionizing radiation such as X-rays and gamma rays.

This application is a continuation-in-part of application Serial No. 620,775, filed November 6, 1956, now abandoned.

Chemical systems presently in use as dosimeters or radiation actinometers are irreversible. That is, they are designed to show a total change in some property (blackening of photographic film, development of acidity in water-chloroform mixtures, etc.), and the amount of such change is taken, after suitable calibration, as a measure of the radiation absorbed by the system. Such dosimeters can be used to measure only a single integrated dose. Moreover, they are not adapted to repeated measurement of dose-rates since they cannot be brought to a zero-setting at a convenient time, marking the beginning of the measurement.

The present invention is based on the discovery that a reversible system, capable of being conveniently brought to a zero-setting, can be obtained by using a solution of ferrous chloride (about $3 \times 10^{-4}$M) and excess ammonium thiocyanate ($2 \times 10^{-3}$M or greater), in a mixed (1 : 1) pyridine-carbon tetrachloride solvent, which can be brought, at will, into contact with metallic mercury. Thus, the solution may be placed in a reaction cell provided with a side-arm and stop-cock, so that, by tilting, the mercury can either be stored in the side-arm reservoir or brought into the main vessel, in contact with the sensitive solution.

Under irradiation with ionizing radiation, a red color develops in the solution, due to formation of a ferric-thiocyanate complex. When mercury is shaken with this irradiated solution, the red color immediately is destroyed (reduction of the ferric thiocyanate complex) and the original yellow color is restored. The irradiation-bleaching cycle of this ferrous-ferric redox couple can be repeated many times, with no loss of sensitivity. The red thiocyanate complex has an absorption peak at 5300 A., and the value of the optical density at this wave-length provides a measure of the radiation dose. Combination of dosage and time measurement will yield a measure of the average dose-rate over a given interval.

The invention will become more apparent from a specific embodiment of a reversible radiation dosimeter made according to the invention as shown in the accompanying drawing, in which Fig. 1 is a front view of the dosimeter.

Figure 1:
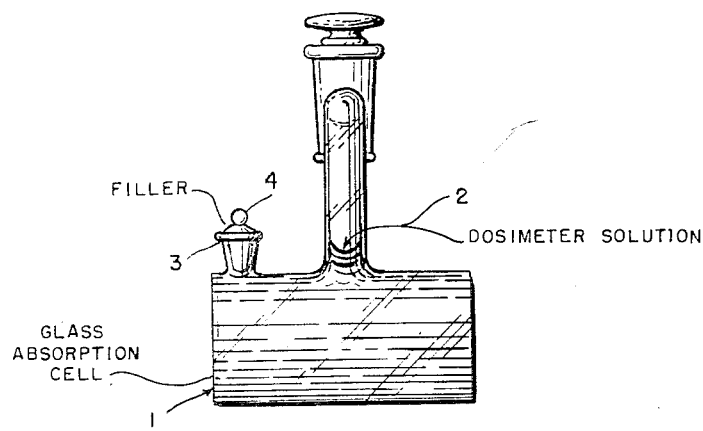
Figure 2:
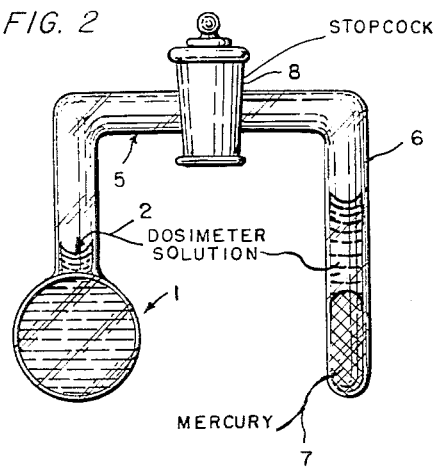
Fig. 2 is a side view.

The apparatus shown in Figs. 1 and 2 consists of a glass reaction cell 1 filled with dosimeter solution 2. The glass cell 1 has an opening 3 for introducing the solution 2. The opening 3 can be tightly closed with a glass stopper 4. The glass cell 1 also carries a U-shaped tube 5, the side arm 6 of which is sealed and contains mercury 7. A stop-cock 8 is provided in the glass tube 5 allowing the mercury in the open position to pass to and from the glass cell 1.

In order to fully understand the inventive idea upon which the new dosimeter operates, the purposes of the various substances used are given as follows:

Ferrous chloride and ammonium thiocyanate serve to provide ferrous and thiocyanate ions for the radiation-induced reaction.

The pyridine acts as a solvent that also stabilizes the original oxidation state (ferrous) and thus facilitates the reversal by reduction. Further, pyridine is miscible with many organic substances (such as carbon tetrachloride) that afford a high yield of free-radicals under action of radiation.

The carbon tetrachloride serves to increase the sensitivity of the device by increasing the yield of free radicals per unit of incident radiation.

Finally, mercury has the function of reducing any ferric-ion present in the system when it is desired to set the dosimeter to zero. The radiation-induced conversion of ferrous to ferric-ion has been known for some time. (Miller, J., Chem. Phys. 28, 87 (1950); Clark and Pickett, J., Am. Chem. Soc. 52, 465 (1930); Sharma, J., Chem. Soc. 1930, 308; Rao, ibid., 1934, 880.) It has not been known, however, to use pyridine for stabilizing the ferrous state and thereby enhance the reversibility of this reaction; nor has it been known that its sensitivity may be increased by the addition of reagents such as carbon tetrachloride.

The following specific example is given to illustrate the invention.

A dosimeter solution made up of ferrous chloride and ammonium thiocyanate dissolved in a mixture of pyridine and carbon tetrachloride is prepared as follows:

First pyridine is purified by fractional distillation from potassium hydroxide and carbon tetrachloride is purified simply by fractional distillation.

The composition of the dosimeter solution is as follows:

Pyridine _____liters__ 1
Carbon Tetrachloride _____do____ 1
Ammonium Thiocyanate _____grams__ 0.5
Ferrous Chloride, crystalline ($FeCl_2 \cdot 4H_2O$) _do____ 0.16

All components should be of reagent-grade quality.

The solution is prepared by mixing 1 liter of pyridine and 1 liter of carbon tetrachloride in a large beaker and adding ammonium thiocyanate and ferrous chloride in the above-mentioned amount, stirring the salts until they are dissolved. This gives a solution approximately $3 \times 10^{-4}$M in $FeCl_2$ and $2 \times 10^{-3}$M in $NH_4CNS$. The amounts of carbon tetrachloride and ammonium thiocyanate may be decreased somewhat if a more stable, less radiation sensitive solution is desired. For instance, instead of the above-mentioned amounts only 500 ml. carbon tetrachloride and 0.25 gm. thiocyanate may be used. The mixture thus prepared may be stored in a tightly stoppered bottle in a cool dark place.

The dosimeter as shown in the drawing is operated with the above-described solution as follows:

To "zero" the dosimeter, the stop-cock is opened and tilted so that the mercury flows into the main cell. The unit is then gently shaken to restore all the iron to the ferrous (yellow) condition. The cell is then tilted back, returning the mercury to the side arm, and the stop-cock closed. The dosimeter is now ready for another exposure to radiation.

Upon irradiation, the color changes to pink, a new intense absorption band developing at 530 m$\mu$. The amount of irradiation is measured quantitatively by the height of this absorption band.

Figure 3:
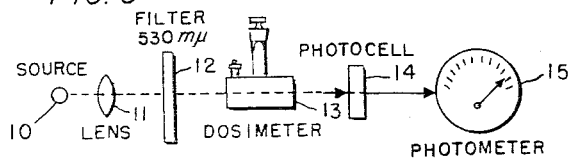
Fig. 3 shows diagrammatically the arrangement for measuring the radiation intensity from the amount of discoloration.

Standard colorometric or spectrometric methods may be used in measuring the optical density of the irradiated solution. In adapting the new dosimeter to a portable instrument, a color filter peaking at 530 mμ may be used and optical densities read directly on a calibrated meter as shown diagrammatically in Fig. 3 in which 10 indicates a light source, 11 a lens directing the light thru a colored filter 12, then thru the dosimeter 13, on to a photo multiplier or a selenium photocell 14 which is connected by a conventional photometric circuit to the calibrated meter 15.

The geometry of the dosimeter according to the invention may be altered to increase sensitivity by increasing the length of the cylindrical absorption cell 1. To avoid effects of light the apparatus may be made of amber glass or covered with a thin sheet of yellow gelatin.

Instead of ammonium thiocyanate other substances yielding "thiocyanate ions" such as potassium thiocyanates may be used.

Instead of pyridine other "organic complexing agents" may be used such as triethylamine, tetrahydrofuran, diethyl ether, phenol, and similar organic compounds carrying "lone pairs" of electrons on N, O, or S atoms.

It will be obvious to those skilled in the art that the basic principle upon which the dosimeter, according to the present invention, operates may be applied to other metal redox systems chosen in such a manner that the system can exist in only a very few oxidation states and that under irradiation one oxidation state is converted to another. In the ideal case the responsive substance in the system will exist in only those states and this minimizes side reactions encountered in radio-chemical processes involving complex molecules and makes it possible to use the system over many cycles.

What is claimed is:
1. A reversible radiation dosimeter for measuring ionizing radiation based on a reversible, radiation sensitive chemical system capable of being brought to a zero-setting, said dosimeter comprising a reaction cell filled with a solution of ferrous chloride and an excess of ammonium thiocyanate in a solvent consisting of a mixture of pyridine and carbon tetrachloride; a reservoir filled with metallic mercury; and means for bringing the mercury from the reservoir in contact with the solution in the reaction cell, said solution forming under irradiation a red ferric-thiocyanate complex which complex can be readily converted back to the colorless ferrous state by contact with metallic mercury.

2. A reversible dosimeter according to claim 1 in which said reaction cell is filled with a solution made by mixing about 1 liter of pyridine, 1 liter of carbon tetrachloride, 0.5 gm. of ammonium thiocyanate and 0.16 gm. of crystalline ferrous chloride ($FeCl_2.4H_2O$).

References Cited in the file of this patent
UNITED STATES PATENTS

| | | |
|---|---|---|
| 1,777,353 | Davis | Oct. 7, 1930 |
| 1,845,835 | Frankenburger et al. | Feb. 16, 1932 |
| 2,063,245 | Haeseler | Dec. 8, 1936 |
| 2,800,589 | Levy | July 23, 1957 |
| 2,805,345 | Warmoltz et al. | Sept. 3, 1957 |
| 2,848,625 | Taplin et al. | Aug. 19, 1958 |
| 2,877,167 | Chalkley | Mar. 10, 1959 |

OTHER REFERENCES

Day, et al., "Chemical Dosimetry of Ionizing Radiations," Nucleonics, February, 1951; pages 34 to 45.

Taplin, et al., "A Colorimetric Dosimeter for Qualitative Measurement of Penetrating Radiation," Radiology, April, 1951; pages 577 to 591.